United States Patent
Yamada et al.

(10) Patent No.: US 10,384,663 B2
(45) Date of Patent: Aug. 20, 2019

(54) VEHICLE ELECTRIFICATION CHARGE REDUCING APPARATUS

(71) Applicant: TOYOTA JIDOSHA KABUSHIKI KAISHA, Toyota-shi, Aichi-ken (JP)

(72) Inventors: Koshi Yamada, Odawara (JP); Toshio Tanahashi, Susono (JP); Hisashi Yabuki, Tagata (JP); Kazuhiko Omasa, Susono (JP); Yoji Kanehara, Nagoya (JP); Nagataka Sassa, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 896 days.

(21) Appl. No.: 14/839,229

(22) Filed: Aug. 28, 2015

(65) Prior Publication Data

US 2016/0059838 A1 Mar. 3, 2016

(30) Foreign Application Priority Data

Aug. 29, 2014 (JP) ................................. 2014-176256

(51) Int. Cl.
*B60R 16/06* (2006.01)
*B60T 17/18* (2006.01)
(Continued)

(52) U.S. Cl.
CPC .............. *B60T 17/18* (2013.01); *B60R 16/06* (2013.01); *B60T 7/04* (2013.01); *B60T 11/16* (2013.01);
(Continued)

(58) Field of Classification Search
CPC .................................................... B60R 16/06
(Continued)

(56) References Cited

U.S. PATENT DOCUMENTS 2,714,181 A * 7/1955 Azbill ....................... H05F 3/02
297/217.1
2,751,523 A * 6/1956 Adams ..................... H05F 3/02
297/217.1
(Continued)

FOREIGN PATENT DOCUMENTS

DE 19508521 A1 9/1996
DE 20200069 U1 11/2002
(Continued)

OTHER PUBLICATIONS

US Patent and Trademark Office, Final Office Action in U.S. Appl. No. 15/018,085 dated Jun. 7, 2017, 26 pages.
(Continued)

*Primary Examiner* — Joseph M Rocca
*Assistant Examiner* — Conan D Duda
(74) *Attorney, Agent, or Firm* — Hunton Andrews Kurth LLP

(57) ABSTRACT

Provided is a vehicle electrification charge reducing apparatus, including: a steering operating device, a steering actuator; and a displacement transmitting system configured to transmit a displacement of the steering operating device to the steering actuator. At least one of the steering operating device, the steering actuator, or the displacement transmitting system includes two members that are engaged with each other through intermediation of a viscous lubricant agent so as to move relatively when the steering operating device is operated. A self-discharge type charge eliminator is fixed to a surface of a specific member forming the displacement transmitting system and the like, and the self-discharge type charge eliminator diselectrifies the specific member through self-discharge so as to decrease a charge amount of the specific member, to thereby decrease a difference in charge amount between the two members.

12 Claims, 8 Drawing Sheets

(51) Int. Cl.
| | |
|---|---|
| *B60T 7/04* | (2006.01) |
| *B60T 11/16* | (2006.01) |
| *B60T 13/74* | (2006.01) |
| *B62D 1/04* | (2006.01) |
| *B62D 5/04* | (2006.01) |

(52) U.S. Cl.
CPC .............. *B60T 13/745* (2013.01); *B62D 1/04* (2013.01); *B62D 5/04* (2013.01)

(58) Field of Classification Search
USPC ....................................................... 180/444
See application file for complete search history.

(56) References Cited

U.S. PATENT DOCUMENTS

| | | | |
|---|---|---|---|
| 2,802,148 A * | 8/1957 | Morris ..................... | B60N 2/58 297/217.1 |
| 3,597,668 A | 8/1971 | Yoshimine | |
| 3,662,217 A * | 5/1972 | Von Berckheim ... | B60H 3/0071 361/231 |
| 3,887,846 A * | 6/1975 | Von Berckheim ....... | A61N 1/10 361/231 |
| 3,922,214 A | 11/1975 | Van Cakenberghe | |
| 4,795,935 A | 1/1989 | Fujii et al. | |
| 4,911,737 A * | 3/1990 | Yehl ......... | A61N 1/10 361/231 |
| 5,009,946 A * | 4/1991 | Hatomoto ................. | B32B 7/02 428/87 |
| 5,021,918 A * | 6/1991 | Maki ..................... | B60B 7/002 152/152.1 |
| 5,095,400 A | 3/1992 | Saito | |
| 5,382,359 A | 1/1995 | Brandt | |
| 5,761,022 A * | 6/1998 | Rankilor ................... | H05F 3/00 361/214 |
| 6,235,385 B1 | 5/2001 | Lee | |
| 7,151,988 B2 * | 12/2006 | Sasaki ..................... | H01T 23/00 701/36 |
| 7,248,454 B2 | 7/2007 | Takayanagi | |
| 7,684,169 B1 | 3/2010 | Larkin | |
| 7,832,528 B1 | 11/2010 | Liang | |
| 7,971,689 B2 | 7/2011 | Moore | |
| 8,183,727 B2 * | 5/2012 | Fee ......................... | H02K 11/40 310/71 |
| 8,262,484 B2 * | 9/2012 | Nakatani ................... | B62D 1/16 464/16 |
| 8,503,154 B2 | 8/2013 | Nakai | |
| 9,044,916 B2 | 6/2015 | Koike et al. | |
| 9,717,136 B2 * | 7/2017 | Simonet ................... | B60R 16/06 |
| 9,751,444 B2 * | 9/2017 | Dickerman .............. | B60N 2/70 |
| 9,827,822 B2 * | 11/2017 | Tanahashi .............. | B60G 13/08 |
| 2002/0179311 A1 | 12/2002 | Alper | |
| 2003/0183465 A1 | 10/2003 | Ikeda | |
| 2004/0060720 A1 | 4/2004 | Riach, Jr. | |
| 2004/0169990 A1 * | 9/2004 | Wada ..................... | F16L 37/0987 361/212 |
| 2005/0018375 A1 | 1/2005 | Takayanagi | |
| 2006/0037959 A1 * | 2/2006 | Hokazono .......... | B60K 15/0406 220/303 |
| 2008/0036241 A1 | 2/2008 | Aisenbrey | |
| 2009/0242334 A1 | 10/2009 | Moore | |
| 2009/0256341 A1 | 10/2009 | Okada et al. | |
| 2009/0268365 A1 * | 10/2009 | Lee ......................... | B62D 1/06 361/220 |
| 2010/0175391 A1 * | 7/2010 | Jee ........................ | B60H 3/0071 62/3.1 |
| 2010/0195259 A1 * | 8/2010 | Johnson .................. | F02P 15/00 361/216 |
| 2012/0039012 A1 | 2/2012 | Nakai | |
| 2013/0248435 A1 * | 9/2013 | Byrd ...................... | B01D 35/26 210/243 |
| 2015/0068346 A1 * | 3/2015 | Simonet .................. | B60R 16/06 74/484 R |
| 2016/0108868 A1 | 4/2016 | Tanahashi et al. | |
| 2016/0177811 A1 | 6/2016 | Tanahashi et al. | |
| 2016/0186639 A1 | 6/2016 | Tanahashi | |
| 2016/0186703 A1 | 6/2016 | Tanahashi et al. | |
| 2016/0200270 A1 | 7/2016 | Tanahashi et al. | |
| 2016/0208748 A1 | 7/2016 | Tanahashi et al. | |
| 2016/0214453 A1 | 7/2016 | Tanahashi | |
| 2016/0223024 A1 | 8/2016 | Tanahashi et al. | |
| 2016/0230824 A1 | 8/2016 | Tanahashi et al. | |
| 2016/0280162 A1 | 9/2016 | Yamada et al. | |

FOREIGN PATENT DOCUMENTS

| | | |
|---|---|---|
| DE | 20200070 U1 | 11/2002 |
| GB | 1201722 A | 8/1970 |
| JP | S50-26778 A | 3/1975 |
| JP | 61-194999 U | 12/1986 |
| JP | H05238438 A | 9/1993 |
| JP | 2001-355524 A | 12/2001 |
| JP | 2002-104106 A | 4/2002 |
| JP | 2006234093 A | 9/2006 |
| JP | 2008-024229 A | 2/2008 |
| JP | 2008-049938 A | 3/2008 |
| JP | 2008-143476 A | 6/2008 |
| JP | 2008181694 A | 8/2008 |
| JP | 2009-181694 A | 8/2009 |
| JP | 2010-192177 A | 9/2010 |
| JP | 2011-111091 A | 6/2011 |
| JP | 3191490 U | 6/2014 |
| WO | 2015/064195 A1 | 7/2015 |

OTHER PUBLICATIONS

European Search Report for Application No. EP 15 18 3018, dated Jan. 28, 2016.
Partial English translation of Office Action in Japanese Patent Application No. 2014-126256, dated Aug. 16, 2016.
Office Action issued in U.S. Appl. No. 15/018,085 dated Dec. 14, 2016.
Notice of Allowance dated Oct. 20, 2017, received in related U.S. Appl. No. 15/018,085.

* cited by examiner

VEHICLE ELECTRIFICATION CHARGE REDUCING APPARATUS

CROSS-REFERENCE TO RELATED APPLICATION

The present application claims priority to Japanese Patent Application No. 2014-176256 filed on Aug. 29, 2014, which is incorporated herein by reference in its entirety.

BACKGROUND OF THE INVENTION

1. Field of the Invention

The present invention relates to an apparatus configured to reduce electric charge that is charged to a vehicle, and more particularly, to an apparatus configured to reduce electric charge that is charged to a device to be driven and operated by a driver.

2. Description of the Related Art

When a vehicle such as an automobile runs, static electricity is generated in the vehicle due to the flow of an air stream in a state that the air stream is brought into friction contact with the vehicle. Static electricity is also generated when each portion of a tire is repeatedly brought into contact with a road surface and separated therefrom along with the rotation of a wheel, when components in an engine, a brake device, or the like move relatively, and the like.

A vehicle is substantially electrically insulated from the ground due to a tire having low conductivity, and hence electric charge (in general, positive electric charge) is charged to a vehicle body or the like when static electricity is generated in the vehicle. Therefore, a structure for reducing electric charge charged to a vehicle through the passage of an electric current has been studied hitherto, and various structures have been proposed.

For example, in Japanese Patent Application Laid-open No. 2009-181694, there is disclosed an electrostatic eliminator having such a configuration that charged silicon is filled into a case in which ceramic bodies are arranged densely in a radial fashion, and one of conductive wires connected to both sides of the case is connected to a minus terminal of a battery and the other conductive wire is connected to a vehicle body. In this type of the electrostatic eliminator, static electricity of the vehicle body is neutralized by grounding, and thus the electric charge charged to the vehicle body can be reduced.

In the related-art electrostatic eliminator as disclosed in Japanese Patent Application Laid-open No. 2009-181694, an electrostatic eliminator having a complicated structure is required, and the electrostatic eliminator is required to be connected to the minus terminal of the battery and the vehicle body through the conductive wires, with the result that an installation space for the electrostatic eliminator is also required.

Meanwhile, when a steering device, a braking device, or the like of a vehicle is operated by a driver, the displacement of an operating device such as a steering wheel is transmitted to an actuator such as a wheel-turning device through a displacement transmitting system. As the result of the experimental study conducted by the inventor(s) of the present invention, it has been found that adverse influences on a vehicle caused by electric charge charged to the vehicle are not merely that a radio noise or the like is liable to be generated. That is, it has been found that, when electric charge is charged to the vehicle, the displacement of the driving operation is less likely to be transmitted, which influences the working of the actuator.

Note that, even when electric charge charged to a vehicle body is reduced by the related-art electrostatic eliminator as disclosed in Japanese Patent Application Laid-open No. 2009-181694, electric charge charged to members that are engaged with each other in the steering device or the like cannot be reduced effectively. That is, depending on the related-art electrostatic eliminator, the influences on the working of the actuator caused by the difficulty in transmitting of the displacement of the driving operation due to charging of electric charge cannot be reduced.

SUMMARY OF THE INVENTION

The present invention has been made in view of the above-mentioned phenomenon that has not hitherto been recognized and the cause thereof. It is a primary object of the present invention to reduce influences on a driving operation such as steering and braking caused by an increase in viscosity of a lubricant agent between members in a steering device or the like when electric charge is charged to the members, thereby enhancing controllability and running stability of a vehicle.

The present invention provides a vehicle electrification charge reducing apparatus to be applied to a vehicle, the vehicle including: an operating device to be operated by a driver; an actuator configured to change a running state of the vehicle; and a displacement transmitting system configured to transmit a displacement of the operating device to the actuator to drive the actuator, at least one of the operating device, the actuator, or the displacement transmitting system including two members that are engaged with each other through intermediation of a viscous lubricant agent so as to move relatively when the operating device is operated, in which the vehicle electrification charge reducing apparatus includes a self-discharge type charge eliminator fixed to a surface of a specific member forming at least one of the operating device, the actuator, or the displacement transmitting system, and the self-discharge type charge eliminator is configured to diselectrify the specific member by changing air on a periphery of the self-discharge type charge eliminator to a negative air ion in accordance with a charge amount of positive electric charge that is charged to the specific member, and to attract the negative air ion to the positive electric charge of the specific member to neutralize the specific member, so as to decrease the charge amount of the specific member, thereby decreasing a difference in charge amount between the two members.

It is not necessarily clear what causes the following phenomenon: when electric charge is charged to a vehicle, the transmissibility of a displacement of a driving operation is decreased, but the main cause of this is considered as follows. The displacement transmitting system and the actuator include a plurality of members that are engaged with each other through intermediation of the viscous lubricant agent so as to move relatively when an operating element is driven. When electric charge is charged to the vehicle, and a potential difference between the members that are engaged with each other through intermediation of the viscous lubricant agent increases, a relatively strong electric field is generated between the members. The electric field acts on the viscous lubricant agent to increase the viscosity thereof to a high value. It is assumed that the increase in viscosity influences the relative movement of the members to decrease the transmissibility of the displacement.

In particular, when electric charge is charged to a member of a steering device to decrease the transmissibility of a displacement of a steering operation, the rattling of the steering device becomes significant, and a driver feels that the response from the steering device is decreased, with the result that the controllability and running stability regarding steering of the vehicle are decreased. Further, when electric charge is charged to a member of a braking device or a clutch operation device, and the transmissibility of a displacement of a braking operation or a clutch operation is decreased, the driver feels that the operability of the braking device or the clutch operation device is decreased, with the result that the controllability and running stability regarding braking or transmission of a driving force of the vehicle are decreased.

According to the above-mentioned configuration, the self-discharge type charge eliminator is fixed to the surface of the specific member forming at least one of the operating device, the actuator, or the displacement transmitting system. The self-discharge type charge eliminator diselectrifies the specific member by changing air on the periphery of the self-discharge type charge eliminator to a negative air ion and attracting the negative air ion to the positive electric charge of the specific member to neutralize the specific member, so as to decrease the charge amount of the specific member, thereby decreasing a difference in charge amount between the two members. Thus, the potential difference caused by the difference in charge amount is reduced to decrease the intensity of the electric field, with the result that an increase amount of viscosity of the viscous lubricant agent caused by the action of the electric field on the viscous lubricant agent may be reduced. Accordingly, the influences on the driving operation such as steering, braking, and transmission of a driving force caused by an increase in viscosity of the viscous lubricant agent are reduced, and the two members that are engaged with each other through intermediation of the viscous lubricant agent are allowed to perform relative movement smoothly to enhance the controllability and running stability of the vehicle.

Note that, according to the above-mentioned configuration, an electrostatic eliminator having a complicated structure is not required, and it is not required to connect the electrostatic eliminator to a minus terminal of a battery or a vehicle body through conductive wires, either. Further, the self-discharge type charge eliminator may be, for example, a thin conductive body capable of performing so-called self-discharge through use of electric charge charged to the specific member, and hence a large space as in the case of installing the electrostatic eliminator is not required.

According to one embodiment of the present invention, in the above-mentioned configuration, the specific member having the self-discharge type charge eliminator fixed thereto may be at least one of the two members.

According to the above-mentioned configuration, the electric charge of at least one of the two members may be reduced through diselectrification by the self-discharge type charge eliminator, with the result that the potential difference between the two members may be reduced effectively. Thus, the intensity of the electric field that acts on the viscous lubricant agent interposed between the two members may be decreased, with the result that an increase amount of the viscosity of the viscous lubricant agent caused by the action of the electric field on the viscous lubricant agent may be reduced effectively.

Further, according to one embodiment of the present invention, in the above-mentioned configuration, the specific member having the self-discharge type charge eliminator fixed thereto may be another member that is conductively connected to at least one of the two members.

According to the above-mentioned configuration, the self-discharge type charge eliminator is fixed to the another member that is conductively connected to at least one of the two members, and hence the potential difference between the two members may be reduced effectively by reducing the electric charge of one of the two members. Thus, even when the self-discharge type charge eliminator may not be directly fixed to the two members, the intensity of the electric field that acts on the viscous lubricant agent interposed between the two members may be decreased, with the result that an increase amount of the viscosity of the viscous lubricant agent caused by the action of the electric field on the viscous lubricant agent may be reduced effectively.

Further, according to one embodiment of the present invention, in the above-mentioned configuration: the another member may include a portion formed of a conductive material and a portion formed of a resin; and a region closest to the self-discharge type charge eliminator in a boundary between the portion formed of the conductive material and the portion formed of the resin may be positioned within a range in which the diselectrification by neutralization is performed.

According to the above-mentioned configuration, the electric charge of the region closest to the self-discharge type charge eliminator in the boundary between the portion formed of the conductive material and the portion formed of the resin may be reduced effectively by the self-discharge type charge eliminator. Thus, the electric charge of the another member may be reduced effectively, compared to the case where the region closest to the self-discharge type charge eliminator in the boundary between the portion formed of the conductive material and the portion formed of the resin is positioned outside of the range in which the diselectrification by neutralization is performed.

Further, according to one embodiment of the present invention, in the above-mentioned configuration: the operating device may be a steering wheel device; the actuator may be an actuator configured to steer a steered wheel; the displacement transmitting system may include an intermediate shaft that is coupled to an upper steering shaft through intermediation of a cross joint at an upper end thereof and is coupled to the actuator through intermediation of a cross joint at a lower end thereof; the two members may include an upper shaft portion and a lower shaft portion, which are spline-connected to each other, of the intermediate shaft; the viscous lubricant agent may be interposed between the upper shaft portion and the lower shaft portion; and the self-discharge type charge eliminator may be fixed to a surface of a region of the steering wheel device as the specific member other than a region to be operated by the driver.

According to the above-mentioned configuration, the viscous lubricant agent is interposed between the upper shaft portion and the lower shaft portion, and the self-discharge type charge eliminator is fixed to the surface of the region of the steering wheel device as the specific member other than the region to be operated by the driver. Thus, the electric charge of the region of the steering wheel device other than the region to be operated by the driver may be reduced, and the electric potential of the upper shaft portion of the intermediate shaft may be decreased through the member coupled to the steering wheel device. Accordingly, the intensity of the electric field that acts between the upper shaft portion and the lower shaft portion may be decreased, with the result that an increase in viscosity of the viscous lubricant agent may be suppressed.

Further, according to one embodiment of the present invention, in the above-mentioned configuration: the operating device may be a steering wheel device; the actuator may be an actuator configured to steer a steered wheel; the displacement transmitting system may include a steering column and an intermediate shaft; the steering column may include an upper steering shaft, and a casing made of a conductive material for rotatably supporting the upper steering shaft; the intermediate shaft may be coupled to the upper steering shaft through intermediation of a cross joint at an upper end thereof and be coupled to the actuator through intermediation of a cross joint at a lower end thereof; the two members may include an upper shaft portion and a lower shaft portion, which are spline-connected to each other, of the intermediate shaft; the viscous lubricant agent may be interposed between the upper shaft portion and the lower shaft portion; the specific member may be a cover made of a resin for accommodating an upper end portion of the steering column, the cover being fixed to the casing; and the self-discharge type charge eliminator may be fixed to a surface of the cover.

According to the above-mentioned configuration, the viscous lubricant agent is interposed between the upper shaft portion and the lower shaft portion, and the self-discharge type charge eliminator is fixed to the surface of the cover made of a resin for accommodating the upper end portion of the steering column, the cover being fixed to the casing. Thus, the electric potential of the upper shaft portion of the intermediate shaft may be decreased through the upper steering shaft by reducing the electric charge of the casing. Accordingly, the intensity of the electric field that acts between the upper shaft portion and the lower shaft portion may be decreased, with the result that an increase in viscosity of the viscous lubricant agent may be suppressed.

Further, according to one embodiment of the present invention, in the above-mentioned configuration: the operating device may be a steering wheel device; the actuator may be an actuator configured to steer a steered wheel; the displacement transmitting system may include a steering column including an upper steering shaft; the steering column may include the upper steering shaft, and a casing made of a conductive material for rotatably supporting the upper steering shaft; the steering column may have an electric power steering device fixed thereto; the electric power steering device may include a first gear wheel member to be driven by an electric motor, a second gear wheel member that is engaged with the first gear wheel member to rotate integrally with the upper steering shaft, and a housing for accommodating the first gear wheel member and the second gear wheel member; the viscous lubricant agent may be interposed between the first gear wheel member and the housing and between the second gear wheel member and the housing; the two members may include the housing and the second gear wheel member; the specific member may be a cover made of a resin for accommodating an upper end portion of the steering column, the cover being fixed to the casing; and the self-discharge type charge eliminator may be fixed to a surface of the cover.

According to the above-mentioned configuration, the viscous lubricant agent is interposed between the first gear wheel member and the housing and between the second gear wheel member and the housing, and the self-discharge type charge eliminator is fixed to the cover made of a resin for accommodating the upper end portion of the steering column, the cover being fixed to the casing. Thus, the electric potential of the housing of the electric power steering device may be decreased by reducing the electric charge of the casing. Accordingly, the intensity of the electric field that acts between the housing and at least one of the first gear wheel member or the second gear wheel member may be decreased, with the result that an increase in viscosity of the viscous lubricant agent may be suppressed.

Further, according to one embodiment of the present invention, in the above-mentioned configuration, the specific member may be one of the two members that is more easily charged.

According to the above-mentioned configuration, the electric charge of one of the two members that is more easily charged may be diselectrified by the self-discharge type charge eliminator, with the result that the electric potential of the member may be decreased to reduce the potential difference between the two members effectively.

Further, according to one embodiment of the present invention, in the above-mentioned configuration: the operating device may be a steering wheel device; the actuator may be an actuator configured to steer a steered wheel; the displacement transmitting system may include an intermediate shaft that is coupled to an upper steering shaft through intermediation of a cross joint at an upper end thereof and is coupled to the actuator through intermediation of a cross joint at a lower end thereof; the two members may include an upper shaft portion and a lower shaft portion, which are spline-connected to each other, of the intermediate shaft; and the self-discharge type charge eliminator may be fixed to a surface of the upper shaft portion.

According to the above-mentioned configuration, the self-discharge type charge eliminator is fixed to the surface of the upper shaft portion. Thus, the electric charge of the upper shaft portion may be reduced, and the potential difference between the upper shaft portion and the lower shaft portion may be reduced, with the result that the intensity of the electric field that acts between the upper shaft portion and the lower shaft portion may be decreased effectively.

Further, according to one embodiment of the present invention, in the above-mentioned configuration: the operating device may be a steering wheel device; the actuator may be an actuator configured to steer a steered wheel; the displacement transmitting system may include a steering column including an upper steering shaft; the steering column may have an electric power steering device fixed thereto; the electric power steering device may include a first gear wheel member to be driven by an electric motor, a second gear wheel member that is engaged with the first gear wheel member to rotate integrally with the upper steering shaft, and a housing for accommodating the first gear wheel member and the second gear wheel member; the viscous lubricant agent may be interposed between the first gear wheel member and the housing and between the second gear wheel member and the housing; the two members may include the housing and the second gear wheel member; and the self-discharge type charge eliminator is fixed to a surface of the housing.

According to the above-mentioned configuration, the electric power steering device is fixed to the steering column, and the self-discharge type charge eliminator is fixed to the surface of the housing of the electric power steering device. Thus, the electric charge of the housing may be reduced, and the potential difference between the housing, and the first gear wheel member and the second gear wheel member may be reduced, with the result that the intensity of the electric field that acts between the housing, and the first gear wheel member and the second gear wheel member may be decreased effectively.

Further, according to one embodiment of the present invention, in the above-mentioned configuration: the operating device may include a brake pedal that is pivotally supported by a bracket fixed to the vehicle body through a pivot; the actuator may include a master cylinder device and a brake booster; the displacement transmitting system may include a push rod of the brake booster; the two members may include the pivot and at least one of the brake pedal or the bracket; the viscous lubricant agent may be interposed between the pivot and the at least one of the brake pedal or the bracket; and the self-discharge type charge eliminator may be fixed to a surface of at least one of the brake pedal, the bracket, or the push rod.

According to the above-mentioned configuration, the self-discharge type charge eliminator is fixed to the surface of at least one of the brake pedal, the bracket, or the push rod. Thus, the electric charge of the member having the self-discharge type charge eliminator fixed thereto may be reduced, and the potential difference between the pivot and at least one of the brake pedal or the bracket may be reduced, with the result that the intensity of the electric field that acts between the pivot and at least one of the brake pedal or the bracket may be decreased effectively. Accordingly, the situation in which the brake pedal pivotally moves around the pivot smoothly may be ensured while an increase in viscosity of the viscous lubricant agent interposed between the pivot and at least one of the brake pedal or the bracket is suppressed.

Further, according to one embodiment of the present invention, in the above-mentioned configuration: the operating device may include a clutch pedal that is pivotally supported by a bracket fixed to the vehicle body through a pivot; the actuator may include a clutch device; the displacement transmitting system may include a drive rod of the clutch device; the two members may include the pivot and at least one of the clutch pedal or the bracket; the viscous lubricant agent may be interposed between the pivot and the at least one of the clutch pedal or the bracket; and the self-discharge type charge eliminator may be fixed to a surface of at least one of the clutch pedal, the bracket, or the drive rod.

According to the above-mentioned configuration, the self-discharge type charge eliminator is fixed to the surface of at least one of the clutch pedal, the bracket, or the drive rod. Thus, the electric charge of the member having the self-discharge type charge eliminator fixed thereto may be reduced, and the potential difference between the pivot and at least one of the clutch pedal or the bracket may be reduced, with the result that the intensity of the electric field that acts between the pivot and at least one of the clutch pedal or the bracket may be decreased effectively. Accordingly, the situation in which the clutch pedal pivotally moves around the pivot smoothly may be ensured while an increase in viscosity of the viscous lubricant agent interposed between the pivot and at least one of the clutch pedal or the bracket is suppressed.

BRIEF DESCRIPTION OF THE DRAWINGS

FIG. 7A and FIG. 7B are schematic explanatory diagrams for illustrating a mechanism of diselectrification by a self-discharge type charge eliminator of the vehicle electrification charge reducing apparatus, in which FIG. 7A is a sectional view, and FIG. 7B is a plan view.

DETAILED DESCRIPTION OF THE PREFERRED EMBODIMENTS

First Embodiment

Figure 1:
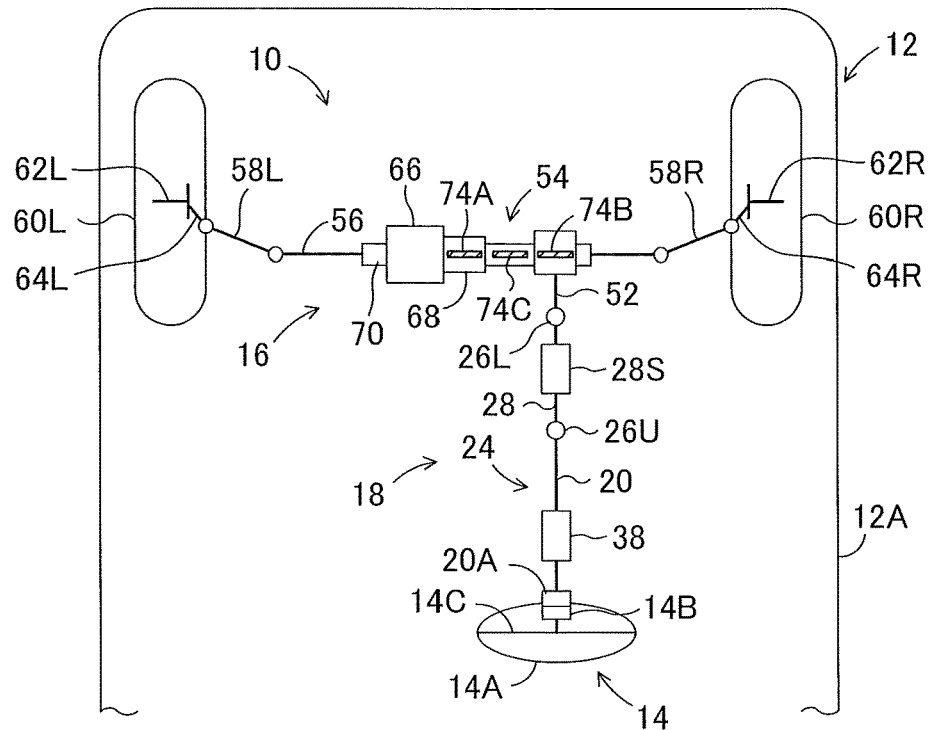
FIG. 1 is a plan view for schematically illustrating a vehicle electrification charge reducing apparatus according to a first embodiment of the present invention.
Figure 2:
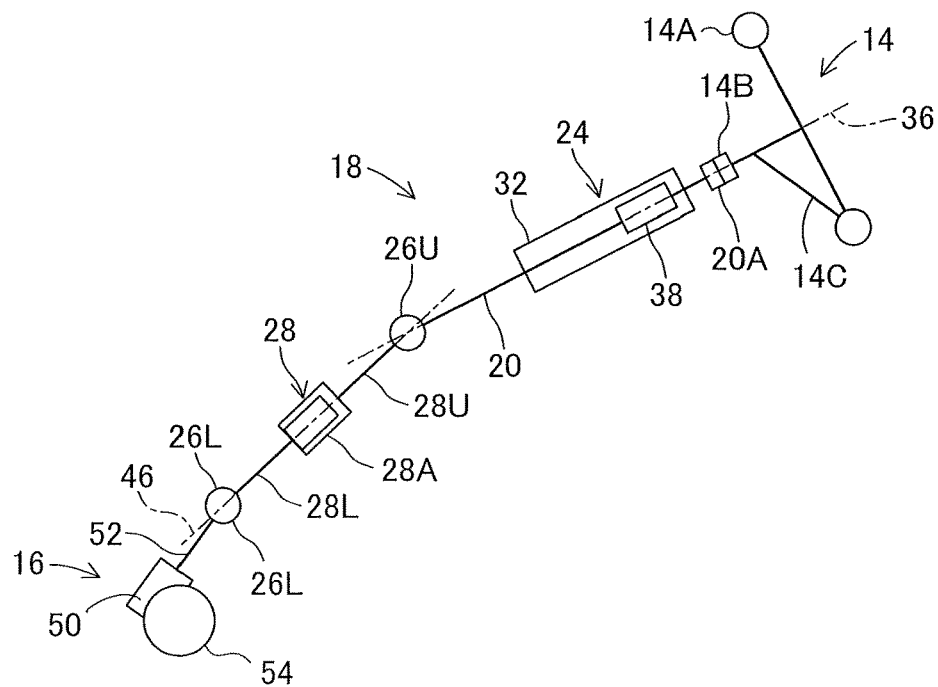
FIG. 2 is a side view for schematically illustrating the vehicle electrification charge reducing apparatus according to the first embodiment of the present invention.

FIG. 1 and FIG. 2 are respectively a plan view and a side view for schematically illustrating a vehicle electrification charge reducing apparatus 10 according to a first embodiment of the present invention.

In FIG. 1, the vehicle electrification charge reducing apparatus 10 is mounted on a vehicle 12, and the vehicle 12 includes a steering wheel device 14 serving as an operating device to be operated by a driver. Further, the vehicle 12 includes a steering actuator 16 configured to change the traveling direction of the vehicle 12 and a displacement transmitting system 18 configured to transmit a rotation displacement of the steering wheel device 14 to the steering actuator 16, thereby driving the steering actuator 16. Note that, in the following description, members are formed of materials having conductivity such as steel and an aluminum alloy, unless the members are defined to be formed of a resin or other materials.

The steering wheel device 14 includes a wheel portion 14A that is held and operated to rotate by the driver, a coupling portion 14B, and a frame portion 14C for connecting the wheel portion 14A to the coupling portion 14B. The frame portion 14C is connected integrally to the coupling portion 14B. The coupling portion 14B is coupled to a coupling portion 20A provided at an upper end of an upper steering shaft 20, with the result that the steering wheel device 14 is coupled integrally to the upper steering shaft 20.

Figure 3:
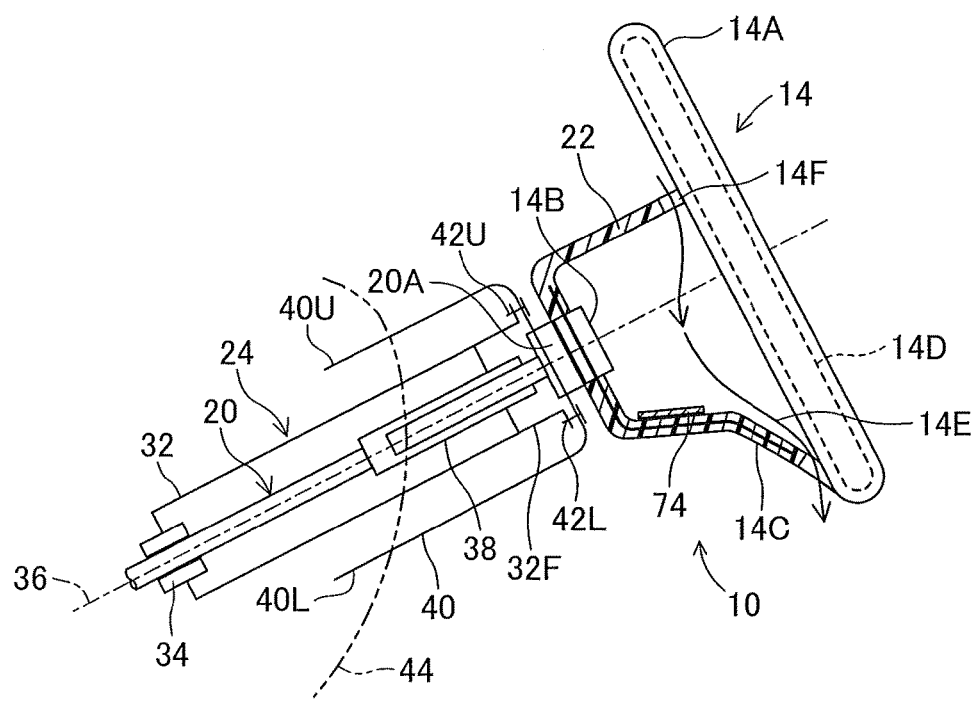
FIG. 3 is an enlarged partial sectional view for illustrating a steering wheel device and a steering column according to the first embodiment.

As illustrated in FIG. 3, the frame portion 14C and a frame portion 14D in the wheel portion 14A are accommodated in a housing 22 made of a resin so as to be buried therein. Note that, the resin forming the housing 22 may be a solid resin or a foamed resin. A space in the housing 22 is not a sealed space, and for example, allows the inflow and outflow of air through a gap 14F or the like, as denoted by an arrow 14E in FIG. 3.

The displacement transmitting system 18 includes a steering column 24 including the upper steering shaft 20, and an intermediate shaft 28. The intermediate shaft 28 is coupled, at an upper end thereof, to a lower end of the upper steering shaft 20 through a cross joint 26U and is coupled, at a lower end thereof, to the steering actuator 16 through a cross joint 26L. The steering column 24 is supported by a vehicle body 12A of the vehicle 12 through a bracket (not shown).

As illustrated in FIG. 3, the upper steering shaft 20 is rotatably supported by a casing 32 of the steering column 24 around a rotation axis line 36 through intermediation of a bearing 34. A torsion bar 38 is provided in an upper end portion of the upper steering shaft 20, that is, a portion close to the coupling portion 20A. The torsion bar 38 is provided for detecting a steering torque by allowing an upper end and a lower end of the upper steering shaft 20 to rotate relatively around the rotation axis line 36 in a limited range.

An upper end portion of the steering column 24 is covered with a column cover 40 made of a resin. The column cover 40 includes an upper half 40U and a lower half 40L that cooperate with each other to surround the steering column 24. An upper end of the upper half 40U and an upper end of the lower half 40L are respectively fastened to a flange portion 32F of the casing 32 with a screw 42U and a screw 42L. A lower end of the upper half 40U and a lower end of the lower half 40L are supported by an instrument panel 44 made of a resin.

The intermediate shaft 28 can rotate around a rotation axis line 46 inclined with respect to the rotation axis line 36. The intermediate shaft 28 includes an upper shaft portion 28U and a lower shaft portion 28L, and the upper shaft portion 28U and the lower shaft portion 28L are spline-connected to each other by a spline-connecting portion 28A so as to be displaced relatively along the rotation axis line 46 and so as not to rotate relatively around the rotation axis line 46. Thus, the intermediate shaft 28 can expand and contract along the rotation axis line 46.

Figure 4:
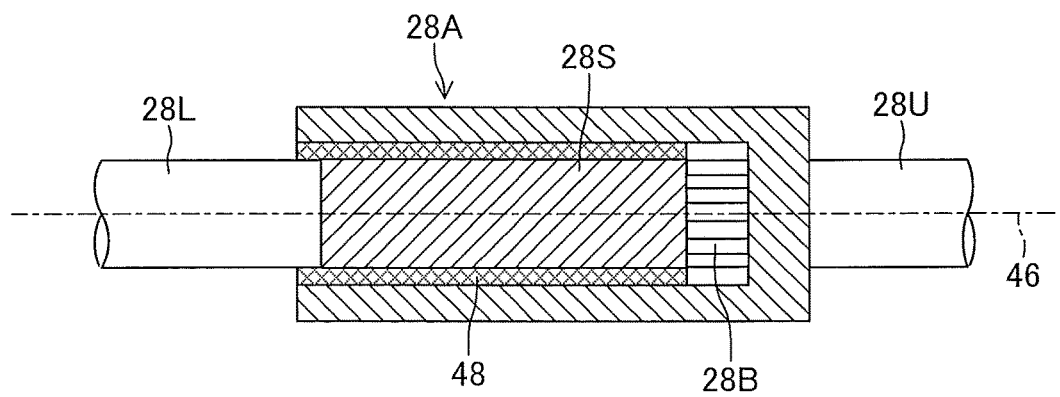
FIG. 4 is an enlarged partial sectional view for illustrating a spline-connecting portion of an intermediate shaft.

As illustrated in FIG. 4, a spline bearing 28B and a spline shaft 28S are provided in a portion in which the upper shaft portion 28U and the lower shaft portion 28L are fitted with each other. The spline bearing 28B and the spline shaft 28S respectively include a plurality of spline grooves and spline teeth, extending along the rotation axis line 46, which are arranged at an equal interval around the rotation axis line 46. Each spline tooth is fitted into the corresponding spline groove, and a grease 48 serving as a viscous lubricant agent is filled into an engagement portion between the spline groove and the spline tooth.

Further, a lower end of the intermediate shaft 28 is coupled to a pinion shaft 52 of a gearbox 50 of the steering actuator 16 through the cross joint 26L. Thus, the rotation of the steering wheel device 14 is transmitted to the pinion shaft 52 via the upper steering shaft 20 and the intermediate shaft 28 of the displacement transmitting system 18. In this case, a stress of expansion and contraction repeatedly acts on the intermediate shaft 28, but the stress is absorbed by the expansion and contraction of the intermediate shaft 28 by the spline-connecting portion 28A.

As illustrated in FIG. 1, the steering actuator 16 includes a rack-and-pinion type steering device 54, and the steering device 54 converts the rotation of the pinion shaft 52 into a linear motion of a rack bar 56 in a vehicle lateral direction. Inner ends of tie rods 58L and 58R are respectively pivotally mounted on both ends of the rack bar 56, and outer ends of the tie rods 58L and 58R are respectively pivotally mounted on knuckle arms 64L and 64R provided at carriers 62L and 62R of a left front wheel 60L and a right front wheel 60R.

Thus, the linear motion of the rack bar 56 in the vehicle lateral direction is converted into an oscillating motion around king pin axes (not shown) of the left front wheel 60L and the right front wheel 60R and transmitted to the carriers 62L and 62R by the tie rods 58L and 58R and the knuckle arms 64L and 64R. Accordingly, the steering actuator 16 steers the left front wheel 60L and the right front wheel 60R in accordance with the rotation of the steering wheel device 14 so as to change the traveling direction of the vehicle, which is one running state of the vehicle 12.

In the illustrated embodiment, the steering device 54 is a rack coaxial electric power steering device and includes an electric motor 66 and, for example, a ball screw type conversion mechanism 68 configured to convert a rotation torque of the electric motor 66 into a force of the rack bar 56 in a reciprocating motion direction. The power steering device 54 drives the rack bar 56 relative to a housing 70 to generate a steering assist force for alleviating a steering burden on the driver.

As is understood from the above description, the rotation of the steering wheel device 14 is transmitted as an oscillation of a change in steering angle to the left front wheel 60L and the right front wheel 60R by the displacement transmitting system 18 and the steering actuator 16. In contrast, when the left front wheel 60L and the right front wheel 60R oscillate in response to a stress of changing the steering angle from a road surface, the oscillation is transmitted as rotation to the steering wheel device 14 by the steering actuator 16 and the displacement transmitting system 18.

Figure 5:
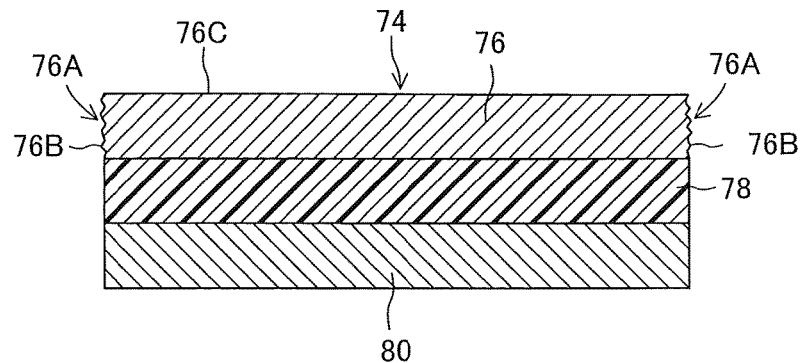
FIG. 5 is an enlarged partial sectional view for illustrating an example of control of suppressing an increase in braking pressure at the beginning of initial braking when a vehicle moves backward in the first embodiment.

As illustrated in FIG. 3, the vehicle electrification charge reducing apparatus 10 includes a strip-shaped self-discharge type charge eliminator 74. The self-discharge type charge eliminator 74 is fixed by bonding to an inner surface of the housing 22 made of a resin for accommodating the frame portion 14C of the steering wheel device 14. As illustrated in FIG. 5, the self-discharge type charge eliminator 74 may be formed by shearing a composite sheet into a predetermined dimension and shape, the composite sheet having such a configuration that a conductive pressure-sensitive adhesive 78 is bonded to a conductive metal foil 76, and release paper 80 that covers the pressure-sensitive adhesive 78 is bonded to the pressure-sensitive adhesive 78.

As described later in detail, a side surface 76A of the metal foil 76, that is, a surface of the metal foil 76 extending in a thickness direction thereof mainly serves as a discharge surface in a diselectrification phenomenon described later. Therefore, it is preferred that the side surface 76A of the metal foil 76 have minute protrusions, that is, convex portions 76B such as angular portions so that the diselectrification phenomenon occurs efficiently. Further, the minute protrusions, that is, the convex portions such as angular portions may be formed on a surface 76C (upper surface of FIG. 5) of the metal foil 76 by subjecting the surface 76C to processing of increasing surface roughness.

As described later in detail, although the metal foil 76 may be formed of any metal having conductivity, it is preferred that the metal foil 76 be formed of aluminum, gold, silver, copper, or an alloy thereof. In particular, in the case where the self-discharge type charge eliminator is fixed to a metallic member as in embodiments described later, it is preferred that the metal foil of the self-discharge type charge eliminator have higher conductivity than a metal material forming the metallic member. Further, it is preferred that the metal foil 76 have a thickness of about from 50 μm to 200 μm so that the side surface 76A of the metal foil 76 have a thickness large enough to serve as the discharge surface sufficiently, and the metal foil 76 can be flexibly deformed so as to fit a curved surface to which the metal foil 76 is to be fixed.

Note that, a planar shape of the self-discharge type charge eliminator 74 is not limited to a strip-shaped rectangle and may be any shape other than a rectangle such as a polygon, a circle, or an oval. It is preferred that the self-discharge type charge eliminator 74 have a planar shape that can be sheared without leaving a portion to be discarded, for example, a rectangle, a square, a rhomboid, a hexagon, or the like. Further, the dimension of the self-discharge type charge eliminator 74 may be appropriately set in accordance with a region to which the self-discharge type charge eliminator 74 is applied. In the case where the self-discharge type charge eliminator 74 has, for example, a rectangular shape, a short side may be about from several mm to more than 10 mm, and a long side may be about from tens of mm to 100 mm.

As described above, when the vehicle 12 runs, positive electric charge is charged to the vehicle 12. The charge amount of electric charge is higher in the resin member than in the metallic member, and the charge amount of the metallic member is higher as the metallic member is more difficult to be grounded to the ground through a tire. In the case of the above-mentioned steering system, the steering actuator 16 includes a large number of regions connected to the vehicle body 12A, and hence the charge amount of the steering wheel device 14 is higher than that of the displacement transmitting system 18.

Figure 6:
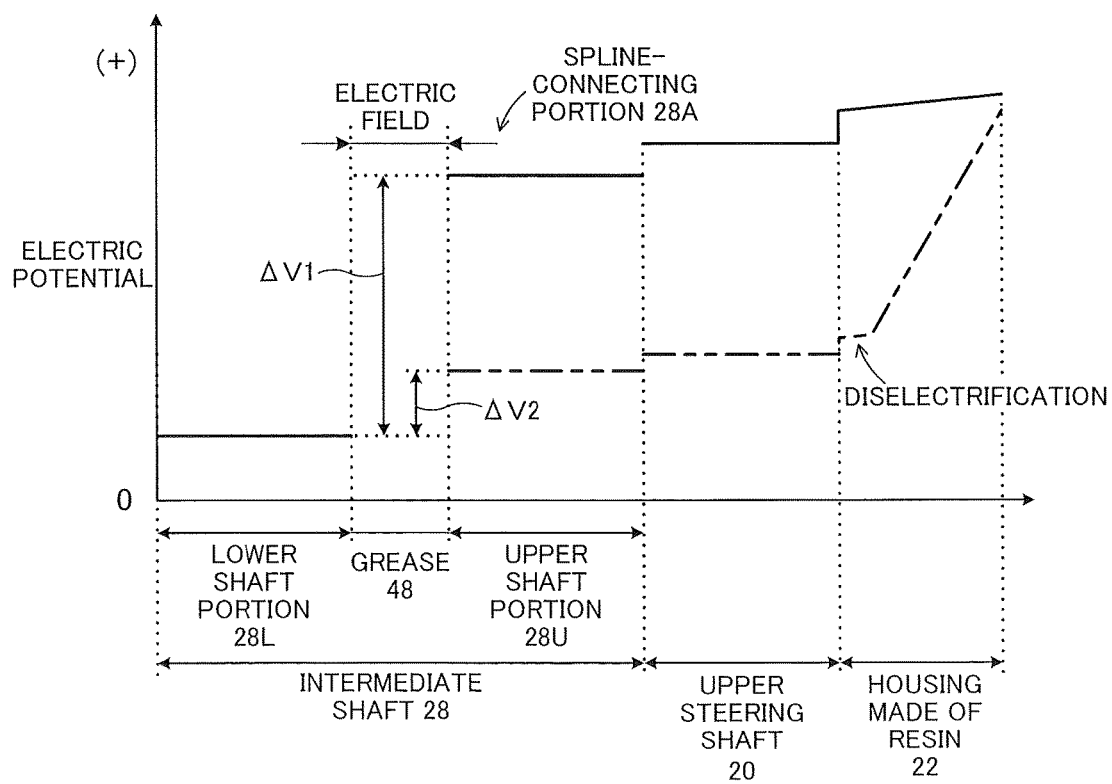
FIG. 6 is a graph for showing a relationship of electric potentials caused by charging of positive electric charge in the intermediate shaft, an upper steering shaft, and the steering wheel device.

FIG. 6 is a graph for showing a relationship of electric potentials caused by charging of positive electric charge in the intermediate shaft 28, the upper steering shaft 20, and the steering wheel device 14. Various members forming the steering actuator 16 include a large number of regions conductively connected to the vehicle body 12A, and hence the charge amount of positive electric charge in the lower shaft portion 28L of the intermediate shaft 28 is relatively small. Thus, as denoted by the solid line in FIG. 6, the electric potential of the lower shaft portion 28L is relatively low.

In contrast, the housing 22 of the steering wheel device 14 is formed of a resin that has a high electric resistance and is easily charged with positive electric charge compared to a metal forming the other members. Thus, the charge amount of positive electric charge in the housing 22 excessively increases, which may excessively increase the electric potential of the housing 22. Therefore, the electric potential of the steering wheel device 14 excessively increases, and the electric potentials of the upper steering shaft 20 and the upper shaft portion 28U of the intermediate shaft 28, which are coupled to the steering wheel device 14, also excessively increase.

As a result, a potential difference ΔV between the upper shaft portion 28U and the lower shaft portion 28L reaches a very high value ΔV1, and a strong electric field acts on the grease 48 filled into the engagement portion between the spline groove and the spline tooth in the spline-connecting portion 28A. The strong electric field causes the viscosity of the grease 48 to increase, which inhibits the expansion and contraction of the intermediate shaft 28 along the rotation axis line 46. Therefore, the transmissibility of the rotation between the upper steering shaft 20 and the pinion shaft 52 through intermediation of the intermediate shaft 28 is decreased.

For example, even when the steering wheel device 14 is operated to rotate so as to rotate the upper steering shaft 20 around the rotation axis line 36, the rotation is not transmitted smoothly to the upper shaft portion 28U via the cross joint 26U. That is, a relative displacement of rattling occurs between a cross piece and a yoke of the cross joint 26U. Therefore, when the rotation torque to be applied to the steering wheel device 14 is low, the intermediate shaft 28 does not rotate, and the steering wheel device 14 rotates around the rotation axis line 36 in a rattling manner. Thus, the driver feels that the controllability of the steering angle of the left front wheel 60L and the right front wheel 60R by the operation of the steering wheel device 14 is decreased. This is aggravated due to an increase in torsional elastic deformation amount of the torsion bar 38.

Similarly, even when the left front wheel 60L and the right front wheel 60R are subjected to a stress from the road surface, and the pinion shaft 52 of the steering device 54 of the steering actuator 16 is rotated, the rotation is not transmitted smoothly to the lower shaft portion 28L via the cross joint 26L. That is, a relative displacement of rattling occurs between a cross piece and a yoke of the cross joint 26L. Therefore, when the rotation torque to be applied to the pinion shaft 52 is low, the intermediate shaft 28 does not rotate, and the pinion shaft 52 rotates around an axis line thereof in a rattling manner. Thus, when the steering angle of the left front wheel 60L and the right front wheel 60R is changed due to a stress from the road surface, the driver feels the change as follows: the controllability of the steering angle for suppressing the steering angle through a holding or rotation operation of the steering wheel device 14 is decreased.

Figure 7A:
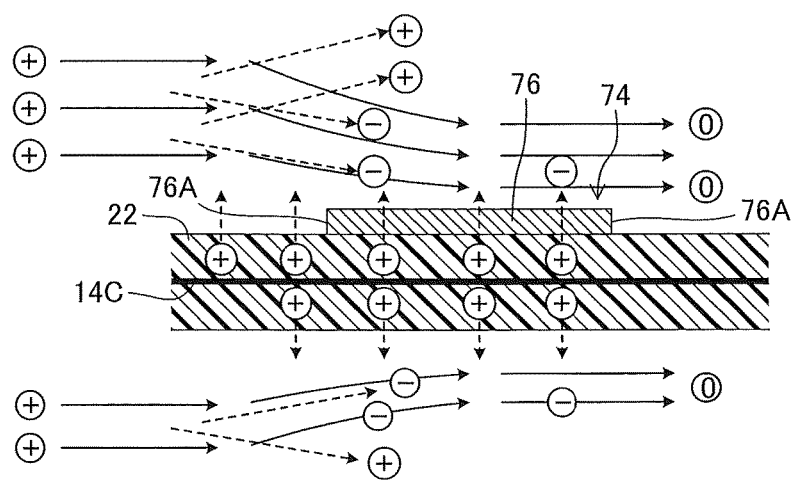
Figure 7B:
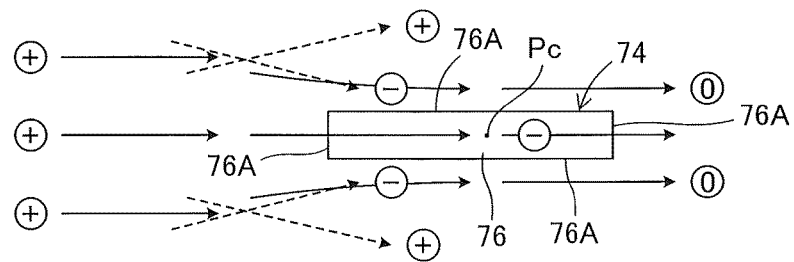

FIG. 7A and FIG. 7B are schematic explanatory diagrams for illustrating a mechanism of diselectrification by the self-discharge type charge eliminator 74, and the diselectrification by the self-discharge type charge eliminator 74 is assumed to be performed by the mechanism illustrated in FIG. 7A and FIG. 7B. Note that, in FIG. 7A and FIG. 7B, reference symbols "+" and "−" respectively denote positive and negative electric charges or ions, and reference symbol "0" denotes electric charge of 0, that is, an electrically neutralized state. Further, the solid arrows denote the flow of air, and the broken arrows denote the movement of the electric charges or ions.

Air is charged with positive electric charge. However, when the charge amount of positive electric charge in the housing 22 made of a resin excessively increases, air is separated into positive air ions and negative air ions due to the so-called corona discharge. The positive air ions move away from the housing 22 due to the repulsive force that acts between the positive air ions and the positive electric charge charged to the housing 22. In contrast, the negative air ions are attracted to the housing 22 due to the Coulomb's force that acts between the negative air ions and the positive electric charge charged to the housing 22, with the result that the negative air ions move closer to the housing 22, and the positive electric charge charged to the housing 22 moves closer to the negative air ions.

As a result, electrical neutralization is caused between the negative air ions and the positive electric charge, and the negative air ions and the positive electric charge disappear, with the result that the electric charge of air becomes 0. The above-mentioned phenomenon repeatedly occurs continuously, and hence the positive electric charge charged to the housing 22 is reduced to diselectrify the housing 22. Note that, the phenomenon in which air is separated into positive air ions and negative air ions due to the corona discharge and the like becomes more active as the charge amount of the housing 22 is higher, and thus it is assumed that the function of diselectrification becomes more active as the charge amount is higher. Further, the diselectrification by the self-discharge type charge eliminator 74 is not limited to a situation in which air flows in one direction as illustrated in FIG. 7A and FIG. 7B.

According to the result of the experimental study conducted by the inventor(s) of the present invention, in the case where the metal foil 76 (aluminum foil having a thickness of 200 μm) of the self-discharge type charge eliminator 74 has a rectangular shape having the above-mentioned dimension or another shape having a similar dimension, the range in a surface direction in which the effect of the above-mentioned diselectrification is exhibited is a range of a radius of about 50 mm from a center Pc of the metal foil 76. Further, the range in a thickness direction in which the effect of the diselectrification is exhibited is a range of about from several mm to more than 10 mm from the bonded surface of the metal foil 76 within the range in which the effect of the diselectrification in the surface direction is exhibited. Note that, the range in which the effect of the diselectrification is exhibited varies depending on the situation such as the charge amount of positive electric charge.

In the illustrated embodiment, in the situation in which a general amount of positive electric charge is charged to the housing 22, a region of the frame portion 14C of the steering wheel device 14 closest to the bonded surface of the aluminum foil 76 is within the range in the thickness direction in which the effect of the diselectrification is exhibited. Further, a region of the coupling portion 14B of the steering wheel device 14 closest to the center Pc of the aluminum foil 76 is within the range in the surface direction in which the effect of the diselectrification is exhibited along an inner surface of the housing 22.

Accordingly, as denoted by the alternate long and two short dashes line in FIG. 6, due to the diselectrification by the self-discharge type charge eliminator 74, the electric potential of the housing 22 is decreased in a region close to the upper steering shaft 20. Thus, the electric potential of the upper steering shaft 20 is decreased, and the electric potential of the upper shaft portion 28U is also decreased consequently.

As a result, the potential difference ΔV between the upper shaft portion 28U and the lower shaft portion 28L reaches a small value ΔV2, and the intensity of the electric field that acts on the grease 48 filled into the spline-connecting portion 28A is decreased. Thus, an increase in viscosity of the grease 48 caused by the action of the electric field is prevented to ensure the situation in which the intermediate shaft 28 can expand and contract smoothly along the rotation axis line 46. Accordingly, the rotation can be smoothly transmitted between the upper steering shaft 20 and the pinion shaft 52 via the intermediate shaft 28.

Note that, the effect of a decrease in viscosity due to the diselectrification by the self-discharge type charge eliminator 74, that is, the favorable influence on the smooth transmission of a displacement in the steering system is exhibited most significantly in the grease 48 filled into the engagement portion between the spline groove and the spline tooth in the spline-connecting portion 28A of the intermediate shaft 28. However, the diselectrification by the self-discharge type charge eliminator 74 also decreases the viscosity of the grease interposed between members that move relatively in another bearing or the like. This also enables the smooth transmission of a displacement in the steering system.

Accordingly, in the vehicle electrification charge reducing apparatus 10 according to the first embodiment, even in the situation in which positive electric charge is charged to the vehicle 12 due to running of the vehicle 12 or the like, a displacement can be satisfactorily transmitted between the steering wheel device 14, and the left front wheel 60L and the right front wheel 60R via the displacement transmitting system 18 and the steering actuator 16. Thus, it is possible to effectively reduce the risk in that the steering angle of the front wheel may become difficult to be controlled by the operation of the steering wheel device 14 and the risk in that a change in the steering angle of the front wheel caused by a stress from the road surface may not be suppressed by a holding or steering operation.

In particular, according to the first embodiment, as illustrated in FIG. 1, the strip-shaped self-discharge type charge eliminators 74A to 74C are mounted on the rack coaxial electric power steering device 54. The self-discharge type charge eliminator 74A is fixed to an outer surface of a housing of the ball screw type conversion mechanism 68, and although not illustrated in FIG. 1, decreases the viscosity of a grease filled into between a nut to be rotated by the electric motor 66 and a threaded shaft that is formed on the rack bar 56 and is fitted with the nut through intermediation of a plurality of balls. The self-discharge type charge eliminator 74B is fixed to an outer surface of a housing of the gear box 50 and decreases the viscosity of a grease interposed between a pinion gear formed integrally with the pinion shaft 52 and rack teeth formed on the rack bar 56. Further, the self-discharge type charge eliminator 74C is fixed to an outer surface of the housing 70 between the ball screw type conversion mechanism 68 and the gear box 50 and decreases the viscosity of a grease interposed between the housing 70 and the rack bar 56.

Thus, compared to the case where the self-discharge type charge eliminators 74A to 74C are not provided, a displacement can be smoothly transmitted in the steering actuator 16. In other words, compared to the case where the self-discharge type charge eliminator is provided only in the steering wheel device 14 serving as the operating device and is not provided in the members of the steering actuator 16, the above-mentioned functional effect exhibited by the diselectrification by the self-discharge type charge eliminator can be more preferably achieved. Note that, any or all of the self-discharge type charge eliminators 74A to 74C may be omitted.

Second Embodiment

Figure 8:
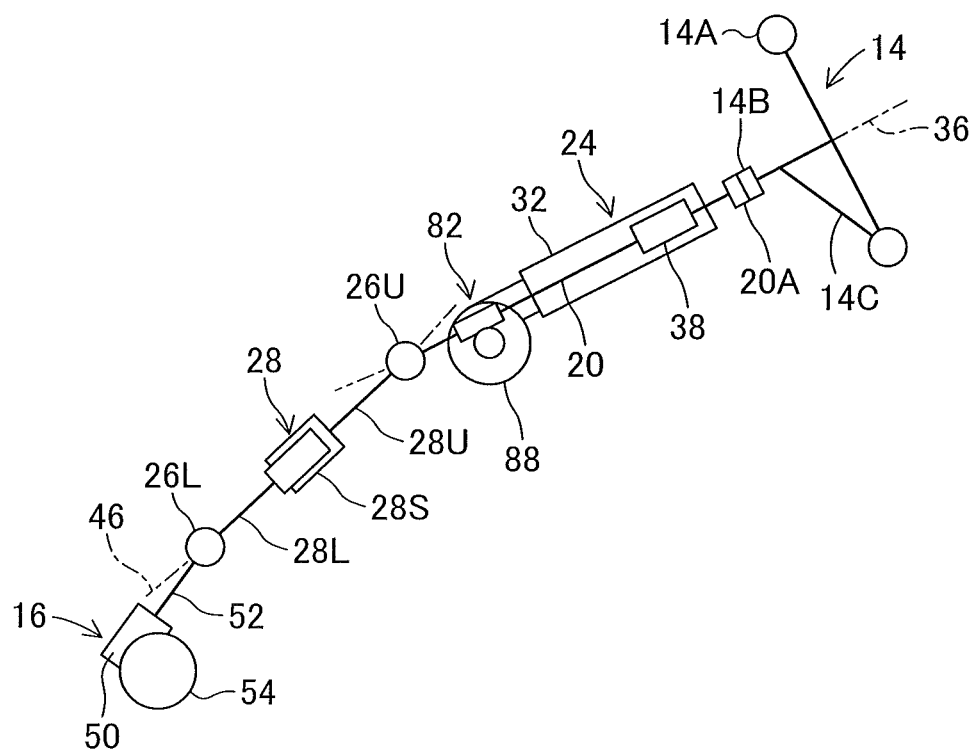
FIG. 8 is a side view for schematically illustrating the vehicle electrification charge reducing apparatus according to the first embodiment of the present invention.

FIG. 8 is a side view for schematically illustrating a vehicle electrification charge reducing apparatus 10 according to a second embodiment of the present invention. The vehicle electrification charge reducing apparatus 10 according to this embodiment is applied to the steering column 24 of the displacement transmitting system 18, and a column assist type electric power steering device 82 is provided in the vicinity of a lower end of the steering column 24. Thus, in this embodiment, the rack coaxial electric power steering device in the first embodiment is not provided, and the steering device 54 is a rack-and-pinion type steering device not having an assist function.

Figure 9:
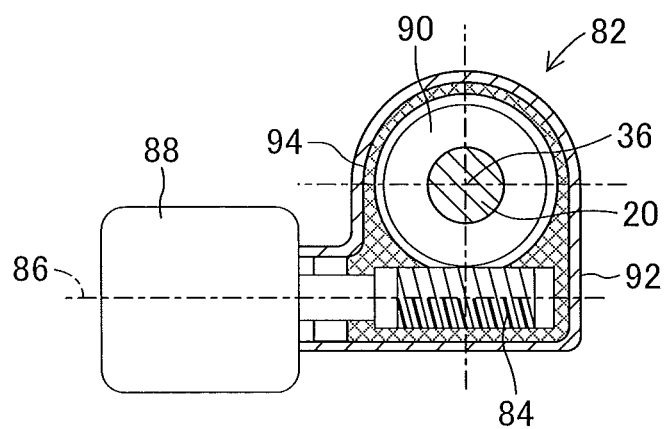
FIG. 9 is a sectional view for illustrating a column assist type electric power steering device according to a second embodiment of the present invention.

As illustrated in FIG. 9, the electric power steering device 82 includes an electric motor 88 that drives and rotates a warm gear 84 around a rotation axis line 86. The rotation axis line 86 extends perpendicularly to the rotation axis line 36 of the upper steering shaft 20 so as to be spaced from the rotation axis line 36. The warm gear 84 is engaged with a warm wheel 90 provided integrally with the upper steering shaft 20. Note that, the warm gear 84 is formed of a resin and may be fixed to a rotation axis of the electric motor 88.

The warm gear 84 and the warm wheel 90 are accommodated in a housing 92, and the housing 92 is coupled integrally to the casing 32 of the steering column 24. A grease 94 that reduces the friction between the warm gear 84 and the warm wheel 90 is filled into the housing 92. The warm gear 84 and the warm wheel 90 cooperate with each other to convert a rotation torque of the electric motor 88 into an assist torque around the rotation axis line 86, to thereby transmit the assist torque to the upper steering shaft 20.

Figure 10:
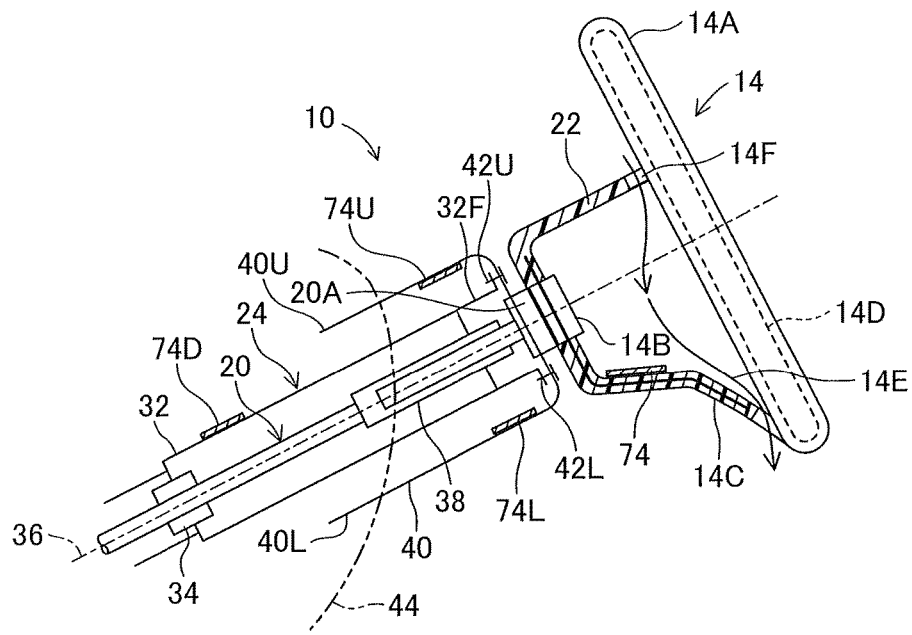
FIG. 10 is an enlarged partial sectional view for illustrating a steering wheel device and a steering column according to the second embodiment.

As illustrated in FIG. 10, self-discharge type charge eliminators 74U and 74L of the vehicle electrification charge reducing apparatus 10 are respectively fixed by bonding to inner surfaces of the upper half 40U and the lower half 40L of the column cover 40 made of a resin so as to be close to each upper end. The self-discharge type charge eliminators 74U and 74L are configured in a similar manner to the self-discharge type charge eliminator 74 according to the first embodiment, and in each of the self-discharge type charge eliminators 74U and 74L, a region of the flange portion 32F of the casing 32 closest to a center of an aluminum foil of the self-discharge type charge eliminator is within a range in a surface direction in which the effect of diselectrification is exhibited along the inner surfaces of the upper half 40U and the lower half 40L.

In particular, in the illustrated second embodiment, a self-discharge type charge eliminator 74D similar to the self-discharge type charge eliminator 74 according to the first embodiment is fixed by bonding to an outer surface of the casing 32 at a position close to the bearing 34.

Note that, also in the second embodiment, the self-discharge type charge eliminator 74 is fixed by bonding to an inner surface of the housing 22 made of a resin for accommodating the frame portion 14C of the steering wheel device 14. Thus, in the same way as in the first embodiment, the electric potential of the housing 22 is decreased through diselectrification by the self-discharge type charge eliminator 74, and the electric potentials of the upper steering shaft 20 and the like are decreased consequently.

Figure 11:
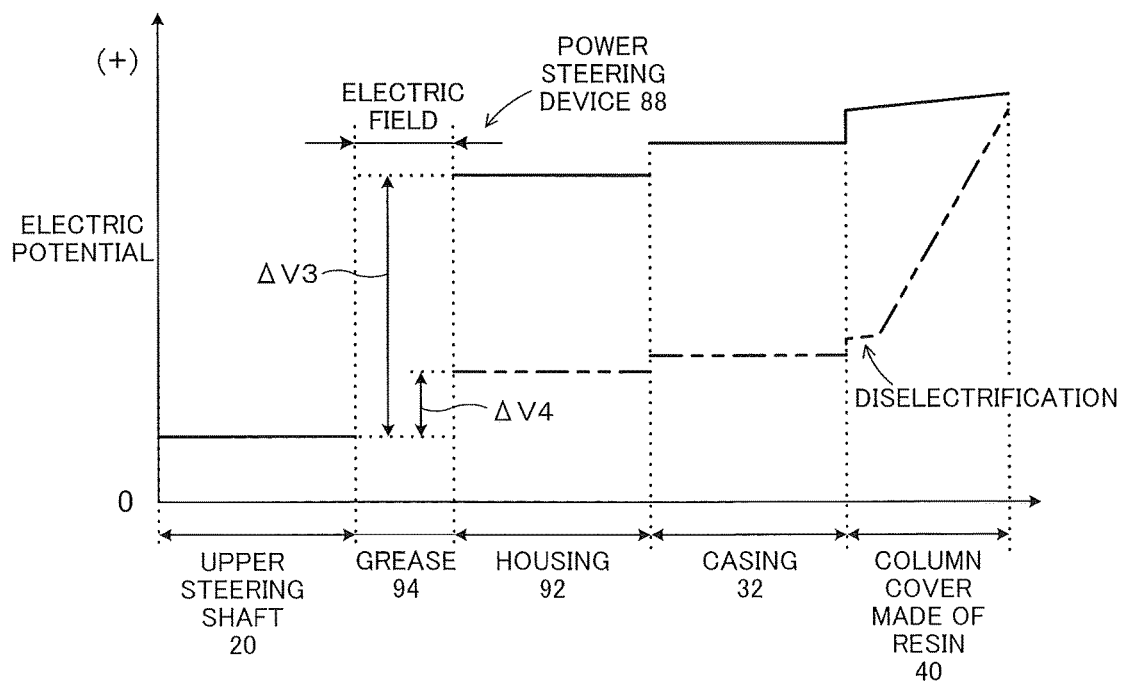
FIG. 11 is a graph for showing a relationship of electric potentials caused by charging of positive electric charge in an upper steering shaft, a casing, a housing of the electric power steering device, and a column cover made of a resin.

FIG. 11 is a graph for showing a relationship of electric potentials caused by charging of positive electric charge in the upper steering shaft 20, the casing 32, the housing 92 of the electric power steering device 82, and the column cover 40 made of a resin. As described above, the electric potential of the upper steering shaft 20 is decreased, and hence the electric potential is relatively low.

In contrast, the column cover 40 is formed of a resin that has a high electric resistance and is charged easily with positive electric charge compared to a metal. Thus, the self-discharge amount of positive electric charge in the column cover 40 excessively increases, which may excessively increase the electric potential of the column cover 40. Therefore, the electric potential of the steering wheel device 14 excessively increases, and the electric potentials of the casing 32 and the housing 92 coupled to the steering wheel device 14 also excessively increase.

As a result, a potential difference $\Delta V$ between the housing 92, and the upper steering shaft 20, the warm wheel 90, and the like reaches a very high value $\Delta V3$, and a strong electric field acts on the grease 94 filled into the housing 92. The strong electric field causes the viscosity of the grease 94 to increase, and hence the friction between the warm gear 84 and the warm wheel 90 increases. Therefore, when the upper steering shaft 20 is rotated by the steering operation, the rotation motion and the rotation torque are not smoothly transmitted between the warm gear 84 and the warm wheel 90. Further, the electric power steering device 82 affects the rotation of the upper steering shaft 20.

In contrast, in the vehicle electrification charge reducing apparatus 10 according to the second embodiment, as denoted by the alternate long and two short dashes line in FIG. 11, the electric potential of the casing 32 is decreased in a region close to the housing 92 through diselectrification by the self-discharge type charge eliminators 74U, 74L, and 74D. Thus, the electric potential of the housing 92 is decreased.

As a result, the potential difference $\Delta V$ between the housing 92, and the upper steering shaft 20, the warm wheel 90, and the like reaches a small value $\Delta V4$, and the intensity of the electric field that acts on the grease 94 filled into the housing 92 is decreased. Thus, an increase in viscosity of the grease 94 caused by the action of the electric field can be prevented. Accordingly, the rotation motion and the rotation toque can be transmitted smoothly between the warm gear 84 and the warm wheel 90, and further it is possible to reduce the risk in that the electric power steering device 82 affects the rotation of the upper steering shaft 20.

Further, according to the second embodiment, the self-discharge type charge eliminator 74 is fixed by bonding to the inner surface of the housing 22 of the steering wheel device 14, and the diselectrification by the self-discharge type charge eliminator 74 is also performed. Accordingly, an increase in viscosity of the grease 48 filled into the engagement portion between the spline groove and the spline tooth in the spline-connecting portion 28A can be prevented, with the result that the functional effect similar to that of the first embodiment can be achieved.

Note that, the self-discharge type charge eliminators 74U and 74L are fixed to the inner surfaces of the upper half 40U and the lower half 40L of the column cover 40 made of a resin, but any one or both of the self-discharge type charge eliminators 74U and 74L may be omitted. Further, the self-discharge type charge eliminator 74D is fixed by bonding to the outer surface of the casing 32 at a position close to the bearing 34, but the self-discharge type charge eliminator 74D may be omitted.

Further, the self-discharge type charge eliminator 74 according to the first and second embodiments is fixed to the inner surface of the housing 22 of the steering wheel device 14, and the self-discharge type charge eliminators 74U and 74L according to the second embodiment are respectively fixed to the inner surfaces of the upper half 40U and the lower half 40L of the column cover 40. Thus, compared to the case where the self-discharge type charge eliminator is fixed to an outer surface of a corresponding member made of a resin, the degradation with time of the self-discharge type charge eliminator can be delayed, and further the risk in that the self-discharge type charge eliminator peels off from the surface can be reduced. Note that, the self-discharge type charge eliminator may be fixed to the outer surface of the corresponding member made of a resin.

Third Embodiment

Figure 12:
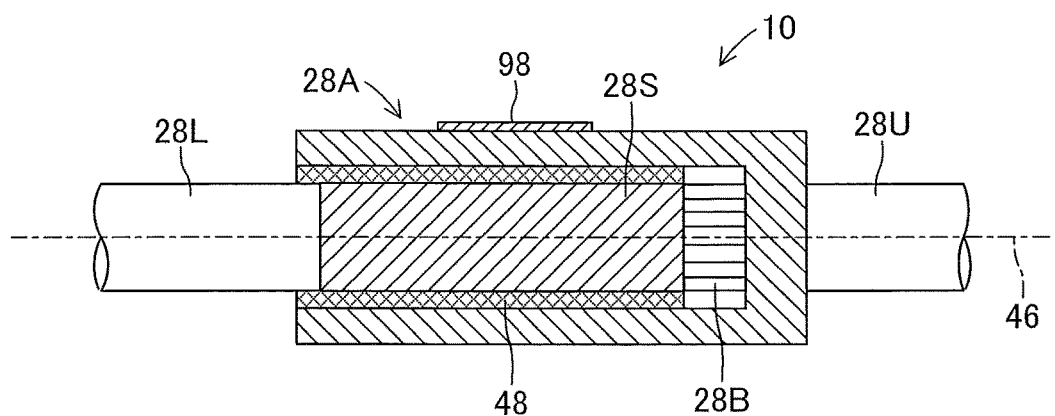
FIG. 12 is a sectional view for schematically illustrating a vehicle electrification charge reducing apparatus according to a third embodiment of the present invention.

FIG. 12 is a sectional view for schematically illustrating a vehicle electrification charge reducing apparatus 10 according to a third embodiment of the present invention. The vehicle electrification charge reducing apparatus 10 according to this embodiment is applied to the spline-connecting portion 28A of the intermediate shaft 28.

As illustrated in FIG. 12, a self-discharge type charge eliminator 98 of the vehicle electrification charge reducing apparatus 10 is fixed by bonding to a surface of the spline-connecting portion 28A formed integrally with the upper shaft portion 28U of the intermediate shaft 28. In other words, the self-discharge type charge eliminator 98 is fixed to a member having a higher electric potential, that is, a member located on a side closer to the steering wheel device 14 among the upper shaft portion 28U and the lower shaft portion 28L of the intermediate shaft 28. Thus, in the case where the intermediate shaft 28 is incorporated in an opposite posture to that of FIG. 1 and FIG. 8, the spline shaft 28S is formed integrally with the upper shaft portion 28U, and hence the self-discharge type charge eliminator 98 is fixed to a surface of the upper shaft portion 28U so as to be close to the spline-connecting portion 28A.

According to the third embodiment, an increase in viscosity of the grease 48 filled into the engagement portion between the spline groove and the spline tooth in the spline-connecting portion 28A is prevented to ensure the situation in which the intermediate shaft 28 can expand and contract smoothly along the rotation axis line 46. Thus, the functional effect similar to that of the above-mentioned first embodiment can be obtained.

Fourth Embodiment

Figure 13:
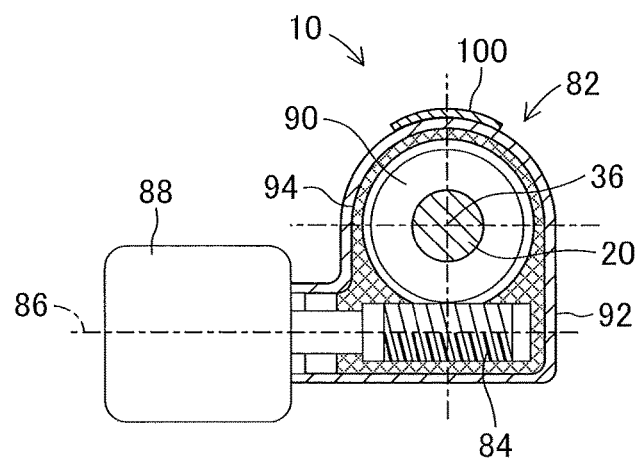
FIG. 13 is a sectional view for schematically illustrating a vehicle electrification charge reducing apparatus according to a fourth embodiment of the present invention.

FIG. 13 is a sectional view for schematically illustrating a vehicle electrification charge reducing apparatus 10 according to a fourth embodiment of the present invention. The vehicle electrification charge reducing apparatus 10 according to this embodiment is applied to the electric power steering device 82 in a vehicle in which the column assist type electric power steering device 82 is provided in the vicinity of a lower end of the steering column 24 in the same way as in the second embodiment.

As illustrated in FIG. 13, a self-discharge type charge eliminator 100 of the vehicle electrification charge reducing apparatus 10 is fixed by bonding to a surface of the housing 92 of the electric power steering device 82. Thus, the self-discharge type charge eliminator 100 decreases the intensity of the electric field that acts on the grease 94 filled into the housing 92 by decreasing the electric potential of the housing 92 through diselectrification. Accordingly, the functional effect similar to that of the above-mentioned second embodiment can be obtained.

Fifth Embodiment

Figure 14:
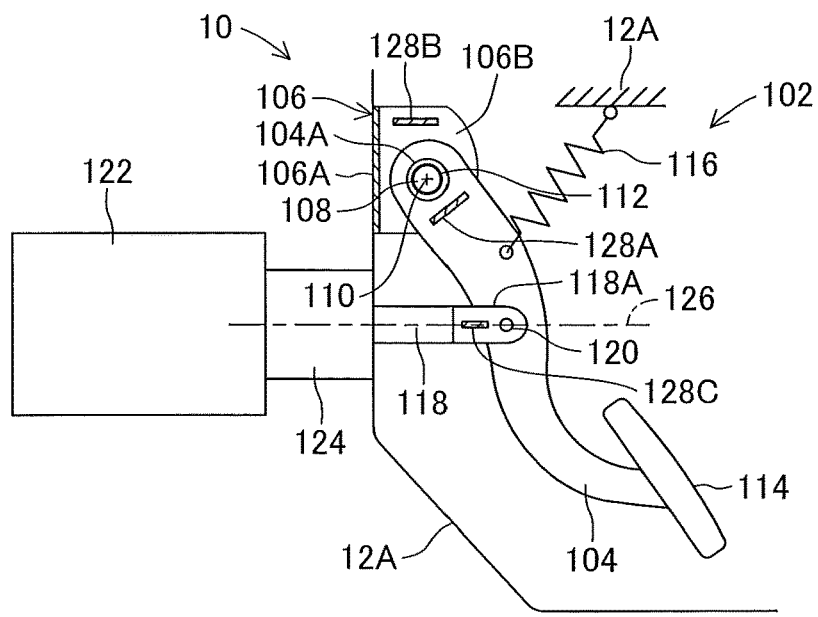
FIG. 14 is a sectional view for schematically illustrating a vehicle electrification charge reducing apparatus according to a fifth embodiment of the present invention.

FIG. 14 is a sectional view for schematically illustrating a vehicle electrification charge reducing apparatus 10 according to a fifth embodiment of the present invention. The vehicle electrification charge reducing apparatus 10 according to this embodiment is applied to a brake pedal device 102 serving as an operating device regarding braking.

As illustrated in FIG. 14, the brake pedal device 102 includes a brake pedal 104 and a bracket 106. The bracket 106 includes a base portion 106A fixed to the vehicle body 12A, and a pair of plate-like support portions 106B that is formed integrally with the base portion 106A and is spaced in the vehicle lateral direction. The brake pedal 104 and the bracket 106 are formed of a metal having conductivity, but at least one of the brake pedal 104 or the bracket 106 may be formed of a resin.

A boss portion 104A is provided in an upper end portion of the brake pedal 104, and a pivot 108 extending in the vehicle lateral direction is inserted in the boss portion 104A. The pivot 108 is supported by the pair of support portions 106B at both ends, and thus the brake pedal 104 is pivotally supported around an axis line 110 of the pivot 108. A grease 112 is interposed between the boss portion 104A and the pivot 108 so that the brake pedal 104 can pivot smoothly around the axis line 110.

A pad 114 for receiving the leg of the driver is formed integrally with a lower end portion of the brake pedal 104. A lower end of a return spring 116 is mounted on a portion between an upper end portion and the lower end portion of the brake pedal 104, and an upper end of the return spring 116 is mounted on the vehicle body 12A. Thus, the brake pedal 104 is biased with a spring force of the return spring 116 in a direction in which a stepping stroke Sb of the brake pedal 104 decreases. Note that, although not shown, the pivotal movement range in a return direction of the brake pedal 104 is limited by a stopper so that the brake pedal 104 does not pivot beyond a position corresponding to the stepping stroke Sb of 0 in a counterclockwise direction of FIG. 14.

A trailing end of a push rod 118 forming the displacement transmitting system regarding braking is coupled to a portion between the upper end portion and the lower end portion of the brake pedal 104 on a side opposite to the return spring 116 (front side of the vehicle). In the illustrated embodiment, a yoke 118A is formed integrally with the trailing end of the push rod 118, and a pair of arm portions of the yoke 118A is positioned on both sides of the brake pedal 104 in the vehicle lateral direction. The pair of arm portions supports a coupling pin 120, and the coupling pin 120 extends through a hole (not shown in FIG. 14) formed in the brake pedal 104. Thus, the push rod 118 can pivot around an axis line of the coupling pin 120 with respect to the brake pedal 104.

In the illustrated embodiment, the push rod 118 is a push rod of a brake booster 124 coupled integrally to a master cylinder 122 and is supported by the brake booster 124 so as to be reciprocated along an axis line 126. When the brake pedal 104 is pivoted around the axis line 110, the pivotal movement thereof is converted into a linear motion along the axis line 126 of the push rod 118 and transmitted to the master cylinder 122 and the brake booster 124.

The brake booster 124 and the master cylinder 122 are driven when the linear motion of the push rod 118 is transmitted to the brake booster 124 and the master cylinder 122. Then, a stepping force applied on the brake pedal 104 is transmitted to the brake booster 124 and the master cylinder 122 via the push rod 118, and thus a braking pressure generated by the master cylinder 122 is controlled to a value corresponding to the stepping force applied on the brake pedal 104. The braking pressure generated by the master cylinder 122 is supplied to a wheel cylinder of a wheel (not shown), and thus a braking force corresponding to the stepping force applied on the brake pedal 104 is generated.

As is apparent from the foregoing, the brake pedal 104, the bracket 106, the pivot 108, the return spring 116, and the like form an operating device regarding a braking operation. The master cylinder 122 and the brake booster 124 serve as a part of an actuator configured to generate a braking force. The push rod 118 and the coupling pin 120 form a displacement transmitting system for braking that is configured to transmit the displacement of the operating device to the master cylinder 122 and the brake booster 124.

In the vehicle electrification charge reducing apparatus 10 according to this embodiment, a self-discharge type charge eliminator 128A is fixed by bonding to one surface of the brake pedal 104 so as to be close to the pivot 108. Further, a self-discharge type charge eliminator 128B is fixed by bonding to an inner surface of one of the pair of support portions 106B of the bracket 106 so as to be close to the pivot 108. Further, a self-discharge type charge eliminator 128C is fixed by bonding to a surface of one of the arm portions of the yoke 118A of the push rod 118.

Thus, the self-discharge type charge eliminators 128A to 128C decrease the intensity of the electric field that acts on the grease 112 applied around the pivot 108 by decreasing the electric potentials of the brake pedal 104 and the bracket 106 through diselectrification. Accordingly, in this embodiment, an increase in viscosity of the grease 112 caused by charging of electric charge in the brake pedal 104 and the like is suppressed to ensure the smooth pivotal movement of the brake pedal 104, and hence the operability of the brake pedal device 102 can be enhanced compared to the related-art example.

Sixth Embodiment

Figure 15:
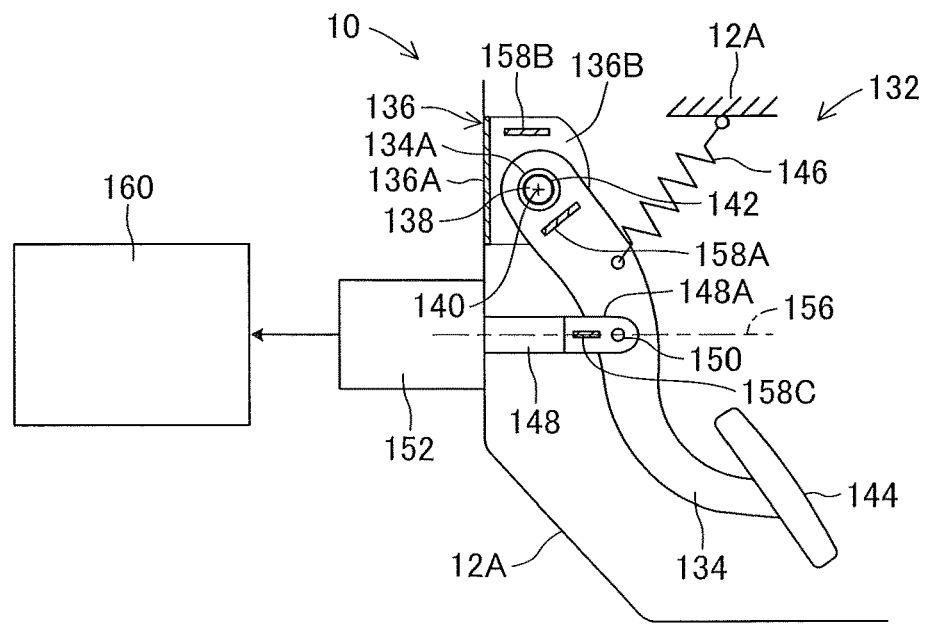
FIG. 15 is a sectional view for schematically illustrating a vehicle electrification charge reducing apparatus according to a sixth embodiment of the present invention.

FIG. 15 is a sectional view for schematically illustrating a vehicle electrification charge reducing device 10 according to a sixth embodiment of the present invention. Note that, in FIG. 15, the same members as those illustrated in FIG. 14 are denoted by the same reference symbols as in FIG. 14. The vehicle electrification charge reducing apparatus 10 according to this embodiment is applied to a clutch pedal device 132.

As is understood from the comparison between FIG. 15 and FIG. 14, the clutch pedal device 132 is configured substantially in the same way as in the brake pedal device 102 according to the fifth embodiment. The clutch pedal device 132 includes a clutch pedal 134, a bracket 136, a pivot 138, a pad 144, and a return spring 146 that respectively correspond to the brake pedal 104, the bracket 106, the pivot 108, the pad 114, and the return spring 146.

A grease 142 is interposed between a boss portion 134A and the pivot 138 provided in the clutch pedal 134 so that the clutch pedal 134 can pivot smoothly around the axis line 110. The clutch pedal 134 and the bracket 136 are formed of a metal having conductivity, but at least one of the clutch pedal 134 or the bracket 136 may be formed of a resin.

A trailing end of a drive rod 148 forming a displacement transmitting system regarding a clutch operation is coupled to a portion between an upper end portion and a lower end portion of the clutch pedal 134. A yoke 148A is formed integrally with the trailing end of the drive rod 148, and a pair of arm portions of the yoke 148A supports a coupling pin 150. The coupling pin 150 extends through a hole (not shown in FIG. 15) formed in the clutch pedal 134. Thus, the drive rod 148 can pivot around an axis line of the coupling pin 150 with respect to the clutch pedal 134.

In the illustrated embodiment, the drive rod 148 is a drive rod of a clutch master cylinder 152 and is supported by the clutch master cylinder 152 so as to be reciprocated along an axis line 156. When the clutch pedal 134 is pivoted around the axis line 140, the pivotal movement thereof is converted into a linear motion along the axis line 156 of the drive rod 148 and transmitted to the clutch master cylinder 152.

The clutch master cylinder 152 is driven when the linear motion of the drive rod 148 is transmitted to the clutch master cylinder 152. Then, a stepping stroke with respect to the clutch pedal 134 is transmitted as a linear displacement to the clutch master cylinder 152 via the drive rod 148, and thus the clutch master cylinder 152 generates a driving pressure corresponding to the linear displacement. The driving pressure generated by the clutch master cylinder 152 is supplied to a drive cylinder (not shown) of a clutch device 160. Then, a drive yoke member coupled to a piston of the drive cylinder performs engagement and separation of a clutch plate, thereby opening and closing a driving force transmission path.

As is apparent from the foregoing, the clutch pedal 134, the bracket 136, the pivot 138, the return spring 146, and the like form an operating device regarding a clutch operation. The clutch master cylinder 152 serves as a part of an actuator configured to open and close the driving force transmission path. The drive rod 148 and the coupling pin 150 form a displacement transmitting system for a clutch that is configured to transmit a displacement of the operating device to the clutch master cylinder 152.

In the vehicle electrification charge reducing apparatus 10 according to this embodiment, a self-discharge type charge eliminator 158A is fixed by bonding to one surface of the clutch pedal 134 so as to be close to the pivot 138. Further, a self-discharge type charge eliminator 158B is fixed by bonding to an inner surface of one of a pair of support portions 136B of the bracket 136 so as to be close to the pivot 138. Further, a self-discharge type charge eliminator 158C is fixed by bonding to a surface of one of the arm portions of the yoke 148A of the drive rod 148.

Thus, the self-discharge type charge eliminators 158A to 158C decrease the intensity of the electric field that acts on the grease 142 applied around the pivot 138 by decreasing the electric potentials of the clutch pedal 134 and the bracket 136 through diselectrification. Accordingly, in this embodiment, an increase in viscosity of the grease 142 caused by charging of electric charge in the clutch pedal 134 and the like is suppressed to ensure the smooth pivotal movement of the clutch pedal 134, and hence the operability of the clutch pedal 134 can be enhanced compared to the related-art example.

The specific embodiments of the present invention are described in detail above. However, the present invention is not limited to the above-mentioned embodiments. It is apparent for those skilled in the art that various other embodiments may be employed within the scope of the present invention.

For example, in each of the above-mentioned embodiments, the charge eliminators such as the self-discharge type charge eliminator 74 are fixed to the members by bonding, but may be fixed to the members by vapor deposition, spraying, or other means.

Further, in each of the above-mentioned embodiments, even in the case where a member to which the self-discharge type charge eliminator 74 or the like is bonded is a metallic member, the self-discharge type charge eliminator 74 or the like is directly fixed by bonding to the member. As described above, the function of diselectrification by the self-discharge type charge eliminator becomes more active as the charge amount is higher. However, the charge amount of electric charge in the metallic member is lower than that in a member made of a resin. Thus, in the case where the self-discharge type charge eliminator is applied to the metallic member, an insertion material made of a resin such as a resin plate may be fixed to the metallic member, and the self-discharge type charge eliminator may be fixed to the insertion material.

Further, in each of the above-mentioned embodiments, when a displacement is transmitted from the operating device to the actuator by the displacement transmitting system, the actuator directly changes the running state of the vehicle by changing the steering angle of a wheel. However, the actuator may include a sensor for detecting a steering operation amount, a braking operation amount, and the like based on the displacement transmitted by the displacement transmitting system and may control the traveling direction of the vehicle, the braking force of the wheel, and the like based on the detected operation amount.

Further, in each of the above-mentioned embodiments, the charge eliminators such as the self-discharge type charge eliminator 74 are fixed to specific positions. However, those positions are shown for an illustrative purpose, and the charge eliminators may be fixed to positions other than the illustrated positions as long as the functional effect similar to that obtained by diselectrification in each of the above-mentioned embodiments is obtained.

Further, two or more of the above-mentioned embodiments may be combined to be applied to a vehicle so that the controllability and stability of the vehicle are further enhanced compared to the case where each embodiment is applied alone to the vehicle.

What is claimed is:

1. A vehicle electrification charge reducing apparatus on a vehicle, the vehicle comprising:
   an operating device to be operated by a driver;
   an actuator configured to change a running state of the vehicle; and
   a displacement transmitting system configured to transmit a displacement of the operating device to the actuator to drive the actuator,
   at least one of the operating device, the actuator, or the displacement transmitting system comprising two members that are engaged with each other through intermediation of a viscous lubricant agent so as to move relatively when the operating device is operated, wherein
   the vehicle electrification charge reducing apparatus comprises a self-discharge charge eliminator fixed to a surface of a specific member forming at least one of the operating device, the actuator, or the displacement transmitting system,
   the self-discharge charge eliminator is configured to diselectrify the specific member by changing air on a periphery of the self-discharge charge eliminator to a negative air ion in accordance with a charge amount of positive electric charge that is charged to the specific member, and to attract the negative air ion to the positive electric charge of the specific member to neutralize the specific member, so as to decrease the charge amount of the specific member, thereby decreasing a difference in charge amount between the two members.

2. A vehicle electrification charge reducing apparatus according to claim 1, wherein the specific member having the self-discharge charge eliminator fixed thereto comprises at least one of the two members.

3. A vehicle electrification charge reducing apparatus according to claim 1, wherein the specific member having the self-discharge charge eliminator fixed thereto is another member that is conductively connected to at least one of the two members.

4. A vehicle electrification charge reducing apparatus according to claim 3, wherein:
   the another member includes a portion formed of a conductive material and a portion formed of a resin; and
   a part of the boundary between the conductive material and the resin portion, closest to the eliminator, is positioned in a range to perform neutralization.

5. A vehicle electrification charge reducing apparatus according to claim 4, wherein:
   the operating device comprises a steering wheel device;
   the actuator comprises an actuator configured to steer a steered wheel;
   the displacement transmitting system includes an intermediate shaft that is coupled to an upper steering shaft through intermediation of a cross joint at an upper end thereof and is coupled to the actuator through intermediation of a cross joint at a lower end thereof;
   the two members include an upper shaft portion and a lower shaft portion, which are spline-connected to each other, of the intermediate shaft;
   the viscous lubricant agent is interposed between the upper shaft portion and the lower shaft portion; and
   the self-discharge charge eliminator is fixed to a surface of a region other than a part operated by the driver of the steering wheel device as the specific member.

6. A vehicle electrification charge reducing apparatus according to claim 1, wherein:
   the operating device comprises a steering wheel device;
   the actuator comprises an actuator configured to steer a steered wheel;
   the displacement transmitting system includes a steering column and an intermediate shaft;
   the steering column includes an upper steering shaft, and a casing made of a conductive material for rotatably supporting the upper steering shaft;
   the intermediate shaft is coupled to the upper steering shaft through intermediation of a cross joint at an upper end thereof and is coupled to the actuator through intermediation of a cross joint at a lower end thereof;
   the two members include an upper shaft portion and a lower shaft portion, which are spline-connected to each other, of the intermediate shaft;
   the viscous lubricant agent is interposed between the upper shaft portion and the lower shaft portion;
   the specific member comprises a cover made of a resin for accommodating an upper end portion of the steering column, the cover being fixed to the casing; and
   the self-discharge charge eliminator is fixed to a surface of the cover.

7. A vehicle electrification charge reducing apparatus according to claim 4, wherein:
   the operating device comprises a steering wheel device;
   the actuator comprises an actuator configured to steer a steering wheel;
   the displacement transmitting system includes a steering column including an upper steering shaft;
   the steering column includes the upper steering shaft, and a casing made of a conductive material for rotatably supporting the upper steering shaft;
   the steering column has an electric power steering device fixed thereto;
   the electric power steering device includes a first gear wheel member to be driven by an electric motor, a second gear wheel member that is engaged with the first gear wheel member to rotate integrally with the upper steering shaft, and a housing for accommodating the first gear wheel member and the second gear wheel member;

the viscous lubricant agent is interposed between the first gear wheel member and the housing and between the second gear wheel member and the housing;

the two members include the housing and the second gear wheel member;

the specific member comprises a cover made of a resin for accommodating an upper end portion of the steering column, the cover being fixed to the casing; and the self-discharge charge eliminator is fixed to a surface of the cover.

8. A vehicle electrification charge reducing apparatus according to claim 2, wherein the specific member is one of the two members that is more easily charged compared to the other one of the two members.

9. A vehicle electrification charge reducing apparatus according to claim 7, wherein:

the operating device comprises a steering wheel device;

the actuator comprises an actuator configured to steer a steering wheel;

the displacement transmitting system includes an intermediate shaft that is coupled to an upper steering shaft through intermediation of a cross joint at an upper end thereof and is coupled to the actuator through intermediation of a cross joint at a lower end thereof;

the two members include an upper shaft portion and a lower shaft portion, which are spline-connected to each other, of the intermediate shaft; and the self-discharge charge eliminator is fixed to a surface of the upper shaft portion.

10. A vehicle electrification charge reducing apparatus according to claim 2, wherein:

the operating device comprises a steering wheel device;

the actuator comprises an actuator configured to steer a steering wheel;

the displacement transmitting system includes a steering column including an upper steering shaft;

the steering column has an electric power steering device fixed thereto;

the electric power steering device includes a first gear wheel member to be driven by an electric motor, a second gear wheel member that is engaged with the first gear wheel member to rotate integrally with the upper steering shaft, and a housing for accommodating the first gear wheel member and the second gear wheel member;

the viscous lubricant agent is interposed between the first gear wheel member and the housing and between the second gear wheel member and the housing;

the two members include the housing and the second gear wheel member; and the self-discharge charge eliminator is fixed to a surface of the housing.

11. A vehicle electrification charge reducing apparatus according to claim 2, wherein:

the operating device includes a brake pedal that is pivotally supported by a bracket fixed to the vehicle body through a pivot;

the actuator includes a master cylinder device and a brake booster;

the displacement transmitting system includes a push rod of the brake booster;

the two members include the pivot and at least one of the brake pedal or the bracket;

the viscous lubricant agent is interposed between the pivot and the at least one of the brake pedal or the bracket; and the self-discharge charge eliminator is fixed to a surface of at least one of the brake pedal, the bracket, or the push rod.

12. A vehicle electrification charge reducing apparatus according to claim 2, wherein:

the operating device includes a clutch pedal that is pivotally supported by a bracket fixed to the vehicle body through a pivot;

the actuator includes a clutch device;

the displacement transmitting system includes a drive rod of the clutch device;

the two members include the pivot and at least one of the clutch pedal or the bracket;

the viscous lubricant agent is interposed between the pivot and the at least one of the clutch pedal or the bracket; and the self-discharge charge eliminator is fixed to a surface of at least one of the clutch pedal, the bracket, or the drive rod.

\* \* \* \* \*